(No Model.)
H. GARDINER.
ELLIPTIC SPRING.
No. 257,569. Patented May 9, 1882.
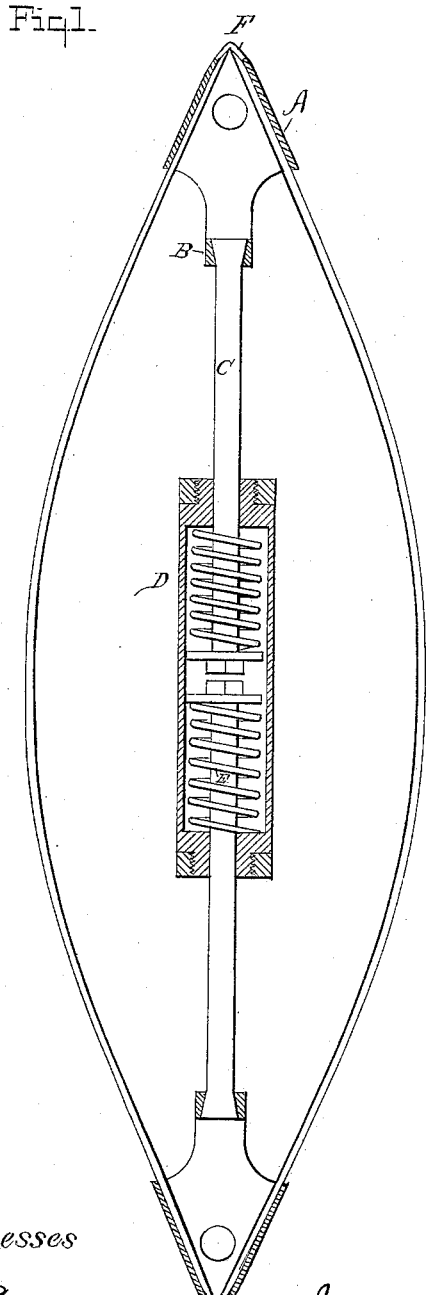
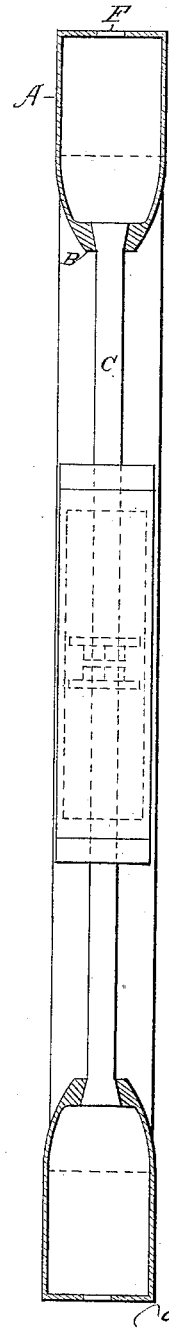
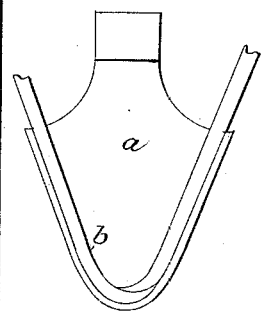
Witnesses
Inventor

UNITED STATES PATENT OFFICE.

HEMAN GARDINER, OF NEW YORK, N. Y.

ELLIPTIC SPRING.

SPECIFICATION forming part of Letters Patent No. 257,569, dated May 9, 1882.

Application filed January 7, 1882. (No model.)

*To all whom it may concern:*

Be it known that I, HEMAN GARDINER, of the city, county, and State of New York, have invented new and useful Improvements in Springs Suitable for Railroad-Cars and other Vehicles, of which the following is a specification.

My invention has reference to that class of springs composed of steel plates, which are combined with steel spiral springs, and commonly known as "elliptic springs."

My invention consists, first, in combining with the usually formed elliptic spring (with truss-rods and spiral springs combined) a metallic knuckle or socket in the shape of a V for the purpose of receiving the ends of the elliptic plates that form the body of the spring; and, also, on the inner side of the V a socket is formed to hold the outer end of the truss-rod, instead of having the forked ends of the rods and bolts through the eyes on the ends of the elliptic plates. This V-shaped socket has a hole through its very apex large enough to admit the truss-rods, which pass through into the inner socket formed on the V or knuckle. This latter socket is made a little tapering, so that by upsetting the ends of the truss-rod it is prevented from drawing through, and holds it firmly in place of the fork and bolt through the eye on the end of the elliptic plates. Another important function of the hole through the apex of this V-shaped knuckle is to pass the truss-rods through before the plates of the elliptic are inserted into this V-shaped socket or knuckle. By this method of connecting the ends of the elliptic springs all the labor of welding and forming eyes to receive bolts is avoided, and a very vulnerable point in breaking is effectually prevented, besides a large amount of labor is saved; and, secondly, in the combination of the parts as a whole, with reference especially to forming a railroad-car and carriage spring.

The usual method of making elliptic springs, especially for light carriages, is to weld up the ends of the plates and form an eye to receive a bolt and nut to hold it together, making a vulnerable point, very likely to fracture or break. The heavier class of springs—such as railroad-car and heavy truck springs—are still more liable to break, on account of being made from much heavier plates of steel. My invention of this knuckle or V-shaped socket to receive the ends of the elliptic plates does away with this liability of breaking, besides saving at least fifty per cent. of labor in its construction. This V-shaped knuckle is firmly held onto the ends of the elliptic plates by means of the truss-rods used to work the spiral springs placed in the cylinder, as shown in Figure 1.

My invention consists in constructing a V-shaped socket to receive the ends of the plates of steel forming the elliptic spring, together with a socket formed on the inner side of the V-shaped knuckle to receive and hold the outer ends of the truss-rods, and by this device securing all the several parts of the spring firmly together, and at the same time giving a free and elastic motion to all its parts as a whole.

In the accompanying drawings, Fig. 1 represents a side sectional elevation of the spring; Fig. 2, a top view of the V-shaped knuckle or socket, showing the connection of knuckle and truss-rods, together with cylinder and spiral springs. Fig. 3 represents a side elevation of the knuckle or socket with ends of the plates forming the elliptic spring inserted.

In all the figures similar letters represent similar parts.

A, Fig. 1, represents the elliptic spring with the ends of the plates inserted in the V-shaped knuckle or socket. B, Fig. 1, represents the socket formed on the inner side of the V-shaped knuckle, in which the ends of the truss-rods are held. C, Fig. 1, represents truss-rods in the inner socket. D, Fig. 1, represents cylinder containing spiral springs. E, Fig. 1, represents spiral springs in cylinder. F, Fig. 1, represents hole in the apex of V-shaped knuckle for passing the truss-rods through before the elliptic plates are inserted.

Fig. 2, A represents top view of knuckle or socket. B, Fig. 2, represents inner socket or knuckle which holds the truss-rods. C, Fig. 2, represents truss bar or rod in inner socket, which connects with spiral springs in cylinder. F, Fig. 2, represents hole in apex of V-shaped knuckle, which receives the ends of plates forming the elliptic spring. In Fig. 3, *a* represents an open space in the knuckle, through which the truss-rods pass into inner socket, B, as shown in Fig. 3. $b$, Fig. 3, represents ends of plates forming the elliptic spring in the knuckle or socket, in which they are firmly held without welding or bolting, and may be inserted straight; or the ends of each plate may be partially turned or curved, as shown in Fig. 3.

It will be seen in the drawings by letters A in Figs. 1 and 2 that my invention consists in a very novel and useful method of making elliptic springs, in combination with my elastic truss-rods. This V-shaped knuckle or socket that holds the ends of the plates is so formed that it protects and holds the ends of the elliptic plates more securely than welding and bolting, and at the same time forms a socket, by its peculiar construction, for holding the ends of the truss-rods which operate the spiral spring contained in the cylinder. This knuckle or socket may be made from any kind of suitable metal, either cast or wrought. Cast will be preferable. As is shown by drawings, it will make a strong, neat, compact, elastic, as well as a very cheap spring.

As will be seen in Fig. 1, D represents cylinder containing spiral springs as part of my invention, in combination with the truss-rods and knuckle-holding ends of plates, making elliptic spring and inner socket-holding ends of truss-rods. In making this cylinder in two halves, casting each half with solid ends, on the outer side of each end I cast a boss with half-hole through it. By placing the two halves together a cylinder is formed with holes to let the truss-rods pass through. This boss, as is shown by D, Fig. 1, is recessed down so as to form a shoulder to receive a thread which admits a nut. The two halves of cylinder being put together, a nut is screwed on the projecting boss and holds them firmly, making a straight surface on the outer side of cylinder in place of the ordinary method of bolts and lugs.

Having thus described my improved method of making my spring and constructing the same, what I claim therein as my invention, and desire to secure by Letters Patent, is—

1. The V-shaped sockets, constructed and operating as set forth, to conform to and hold the elliptical plates, and to secure the ends of the tension-rods by means of the bearings in the apex of the socket, and the bearing having the tapered opening across the base of the socket.

2. The V-shaped socket, having an opening in its apex and a conical opening or seat in its base, in combination with a tension-rod having an upset or conical head adapted to be passed through the opening in the apex, and seated in the base, substantially as described.

3. The cylinder constructed in two parts, as described, with bosses cast on each end to receive thread and nuts to hold the two halves of the cylinder together, in combination with spiral spring E, truss-rods C, and knuckle A, all for the purposes set forth.

HEMAN GARDINER.

Witnesses:
M. J. FINDLEY,
JOHN P. JAYNE.